(12) United States Patent
Ebihara

(10) Patent No.: US 7,198,343 B2
(45) Date of Patent: Apr. 3, 2007

(54) IMAGE PRINTING APPARATUS

(75) Inventor: Toshiyuki Ebihara, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/925,094

(22) Filed: Aug. 24, 2004

(65) Prior Publication Data
US 2005/0024420 A1 Feb. 3, 2005

Related U.S. Application Data

(63) Continuation of application No. PCT/JP03/02139, filed on Feb. 26, 2003.

(30) Foreign Application Priority Data
Feb. 26, 2002 (JP) .............................. 2002-050176

(51) Int. Cl.
B41J 29/38 (2006.01)
(52) U.S. Cl. .............................. 347/12; 347/13; 347/14
(58) Field of Classification Search .................. 347/12, 347/13, 14, 49, 19
See application file for complete search history.

(56) References Cited

U.S. PATENT DOCUMENTS 5,450,099 A * 9/1995 Stephenson et al. ........ 347/200
6,394,573 B1 * 5/2002 Lapstun et al. ................ 347/19
2002/0008731 A1 * 1/2002 Matsumoto et al. .......... 347/42

FOREIGN PATENT DOCUMENTS

| JP | 56-63470 A | 5/1981 |
| JP | 6-255175 A | 9/1994 |
| JP | 6-270453 A | 9/1994 |
| JP | 9-146262 A | 6/1997 |
| JP | 2001-30544 A | 2/2001 |
| JP | 2001-328292 A | 11/2001 |
| JP | 2002-2015 A | 1/2002 |
| JP | 2002-36628 A | 2/2002 |

* cited by examiner

Primary Examiner—Julian D. Huffman
(74) Attorney, Agent, or Firm—Frishauf, Holtz, Goodman & Chick, P.C.

(57) ABSTRACT

An image printing apparatus prints image data using a plurality of printheads. A correction parameter is set in accordance with a printing element positional relationship between the plurality of printheads. A density correction signal calculation unit calculates a density correction signal based on the correction parameter and a signal value of at least one pixel adjacent to a switching position of image data from a printing element of one printhead to a printing element of another printhead. A quantization unit quantizes the density correction signal into a quantized density correction signal. A correction signal printing unit forms at least one print dot adjacent to the switching position of a line including at least one pixel or a neighboring line based on the quantized density correction signal.

14 Claims, 9 Drawing Sheets

IMAGE PRINTING APPARATUS

CROSS REFERENCE TO RELATED APPLICATIONS

This is a Continuation Application of PCT Application No. PCT/JP03/02139, filed Feb. 26, 2003, which was published under PCT Article 21 (2) in Japanese.

This application is based upon and claims the benefit of priority from prior Japanese Patent Application No. 2002-050176, filed Feb. 26, 2002, the entire contents of which are incorporated herein by reference.

BACKGROUND OF THE INVENTION

1. Field of the Invention

The present invention relates to an image printing apparatus and, more particularly, to an image printing apparatus such as a printer, facsimile, or copying machine which increases the print width using a plurality of printheads.

2. Description of the Related Art

Image processing apparatuses such as a printer and copying machine adopt image printing apparatuses of thermal printing type, heat transfer printing type, inkjet printing type, and the like. These printing methods use a printhead in which many printing elements for forming print dots are linearly arranged at equal intervals. Methods of forming an image with such printhead include two-valued printing in which each print dot takes only two, printed and unprinted states and halftone is expressed by the density of print dots, and multi-valued printing in which each print dot can take a plurality of (generally three or more) density levels and more smooth halftone expression can be realized.

Upon manufacturing a printhead, as it becomes longer, the manufacturing yield of non-defectives becomes lower in the manufacture to raise the cost. To prevent this problem, there is proposed a method of increasing the print width using many printheads whose print width is short at low manufacturing cost.

For example, Jpn. Pat. Appln. KOKAI Publication No. 6-255175 discloses a method which makes a joint inconspicuous. According to this method, a plurality of printheads which print image data are arranged (linked) on a substantially straight line so that their ends overlap each other. In supplying image signals to the printheads, the switching positions of the printheads at joints are irregularly changed for each scanning line.

In the prior art, the density of a printed image may become higher or lower than a predetermined one depending on the installation position of the printhead at the joint between printheads. This degrades the image quality.

In multi-valued printing capable of expressing a plurality of density levels by one print dot, a higher-quality image is formed in comparison with two-valued printing. A joint stands out when an image is formed only by dividing the print range of each printhead into a random shape at the joint between two printheads.

BRIEF SUMMARY OF THE INVENTION

It is an object of the present invention to provide an image printing apparatus which reduces density nonuniformity at the joint between printheads and increases the image quality.

According to the first aspect of the present invention, there is provided an image printing apparatus which prints image data using a plurality of printheads each having a plurality of printing elements and arranged side by side in a substantially array direction of the printing elements, comprising:

a density correction signal calculation unit which calculates a density correction signal on the basis of a correction parameter set in accordance with a printing element positional relationship between the plurality of printheads in the array direction, and a signal value of at least one pixel adjacent to a switching position of image data from a printing element of one printhead to a printing element of another printhead at an adjacent portion between the plurality of printheads;

a quantization unit which quantizes the density correction signal from the density correction signal calculation unit into a quantized density correction signal having a signal level that can be input to the printhead; and a correction signal printing unit which forms at least one print dot adjacent to the switching position of a line including the at least one pixel or a neighboring line on the basis of the quantized density correction signal from the quantization unit.

According to the second aspect of the present invention, the image printing apparatus according to the first aspect also includes a division boundary data generation unit which generates division boundary data for changing the switching position for each print line. According to the third aspect of the present invention, the image printing apparatus according to the first aspect also includes a quantized density correction signal correction unit which corrects the quantized density correction signal in accordance with a magnitude of a quantization error generated by quantization of the quantization unit.

According to the fourth aspect of the present invention, the image printing apparatus according to the first aspect also includes a print dot interval detection unit which detects a print dot interval at the switching position as an amount representing the positional relationship between the plurality of printheads.

According to the fifth aspect of the present invention, in the image printing apparatus according to the first aspect, the density correction signal calculation unit calculates the density correction signal on the basis of a product of the correction parameter and the signal value of the at least one pixel adjacent to the switching position.

According to the sixth aspect of the present invention, in the image printing apparatus according to the first aspect, the signal printing unit adds a print dot to a position adjacent to the switching position on the basis of the quantized density correction signal when correction to increase a print density is performed, and prints a print dot adjacent to the switching position on the basis of the quantized density correction signal when correction to decrease the print density is performed.

According to the seventh aspect of the present invention, in the image printing apparatus according to the third aspect, the quantized density correction signal correction unit includes a random number generation unit, and a comparison unit which compares the quantization error and a random number from the random number generation unit.

According to the eighth aspect of the present invention, in the image printing apparatus according to the third aspect, in accordance with the quantization error generated by quantization of the quantization unit, the quantized density correction signal correction unit corrects the quantized density correction signal on a print line processed after a print line suffering the quantization error.

DETAILED DESCRIPTION OF THE INVENTION

A preferred embodiment of the present invention will be described in detail below with reference to the several views of the accompanying drawing.

(First Embodiment)

Figure 1:
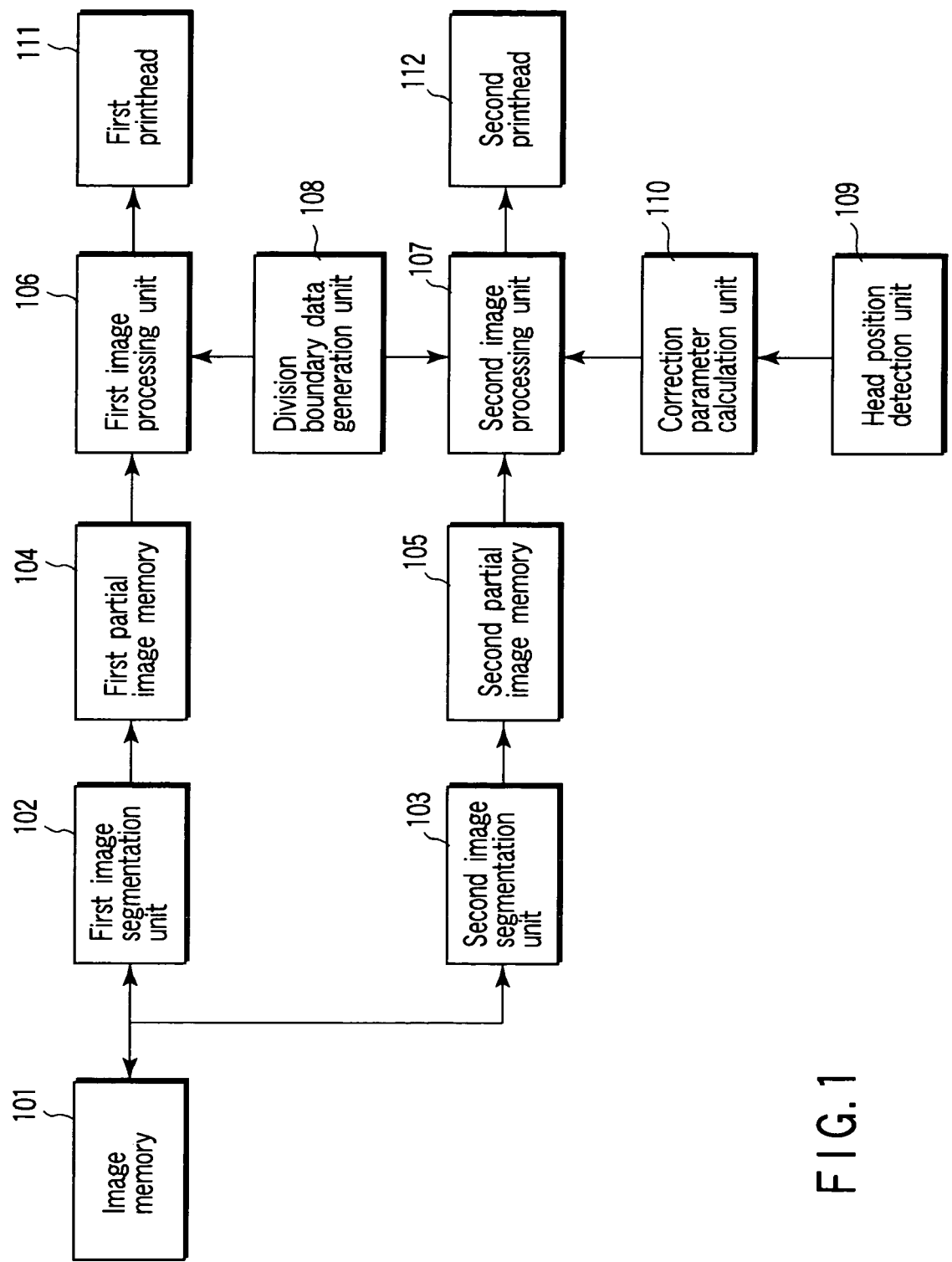
FIG. 1 is a block diagram showing the arrangement of an image printing apparatus according to the first embodiment of the present invention.

FIG. 1 is a block diagram for explaining the first embodiment of the present invention. In FIG. 1, an image memory 101 holds image data input to an image printing apparatus. A first image segmentation unit 102 and second image segmentation unit 103 are respectively arranged for first and second printheads 111 and 112 each of which is formed from a plurality of printing elements and prints an image in accordance with an input signal. The first and second image segmentation units 102 and 103 segment image data to be printed by the printheads 111 and 112 from input image data. A first partial image memory 104 and second partial image memory 105 hold segmented partial images.

A first image processing unit 106 and second image processing unit 107 perform an image process for improving the image quality at the joint between the first and second printheads 111 and 112. Details of this process will be described later. A division boundary data generation unit 108 outputs information on the switching positions of image data supplied to the printheads 111 and 112. A head position detection unit 109 detects the positional relationship (relative positions) between the first and second printheads 111 and 112. A correction parameter calculation unit 110 calculates a correction parameter corresponding to the detected positional relationship between the first and second printheads 111 and 112.

An image input to the image printing apparatus is first stored in the image memory 101. The first image segmentation unit 102 and second image segmentation unit 103 read out image data from the image memory 101, and segment partial image data for forming images by the first printhead 111 and second printhead 112. The segmented image data are respectively stored in the first partial image memory 104 and second partial image memory 105.

Figure 2:
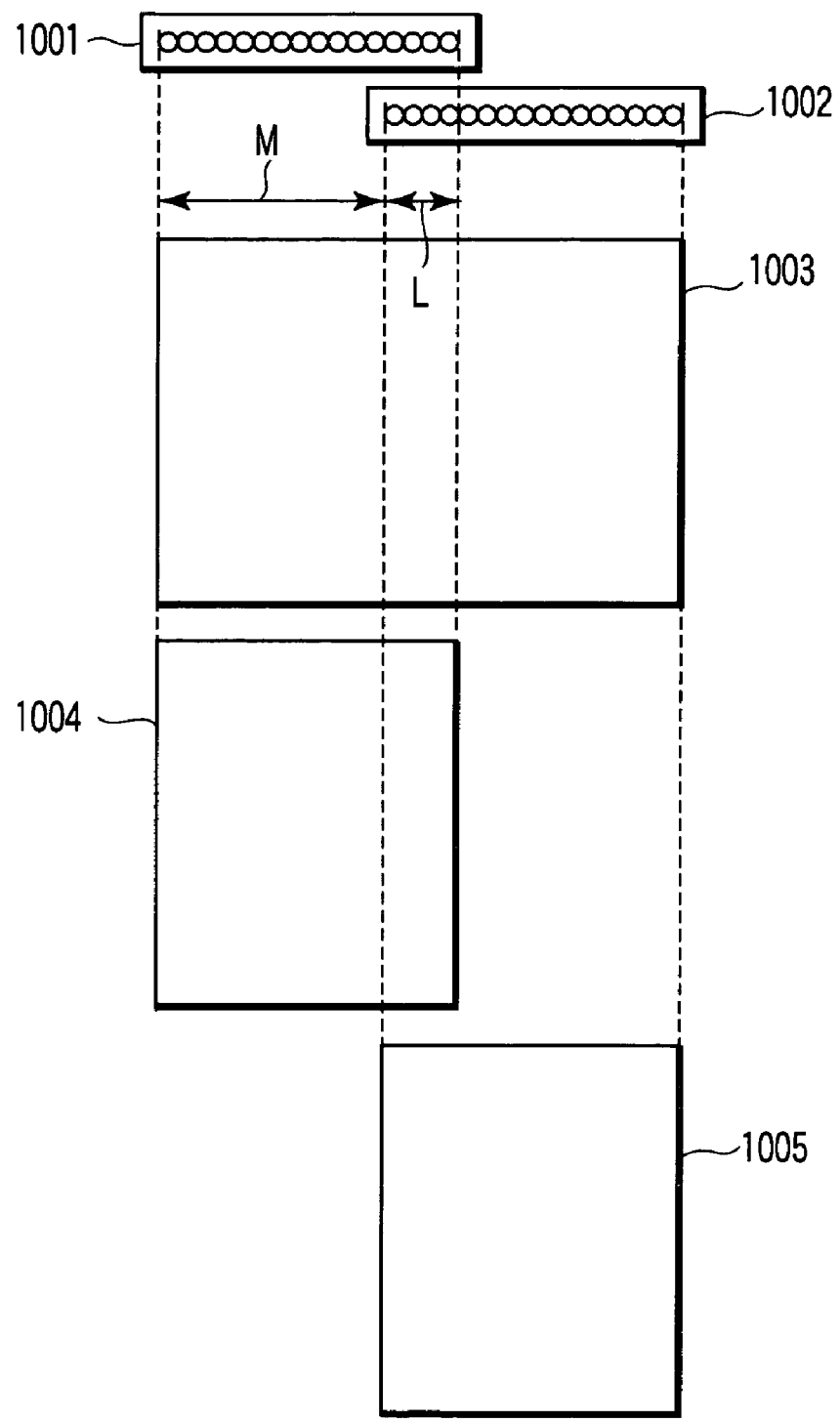
FIG. 2 is a view for explaining a partial image segmentation method.

The above-mentioned image segmentation process will be explained in detail with reference to FIG. 2. FIG. 2 shows the positional relationship between a first printhead 1001 and a second printhead 1002. The first printhead 1001 and second printhead 1002 partially overlap each other.

Reference numeral 1003 denotes image data input to the image printing apparatus. Reference numeral 1004 denotes first partial image data which is segmented from the image data 1003 by the first image segmentation unit (102 in FIG. 1) and stored in the first partial image memory (104 in FIG. 1). Reference numeral 1005 denotes second partial image data which is segmented from the image data 1003 by the second image segmentation unit (103 in FIG. 1) and stored in the second partial image memory (105 in FIG. 1). The first partial image data 1004 and second partial image data 1005 have a common portion (overlapping portion) by a width L. The range within which the first printhead (111 in FIG. 1) forms an image and the range within which the second printhead (112 in FIG. 1) forms an image are changed within the range of the width L for each line.

Referring back to FIG. 1, the first image processing unit 106 performs an image process for improving the image quality at the joint between printheads, for partial image data stored in the first partial image memory 104. At this time, position information output from the division boundary data generation unit 108 is referred to as the shape of the joint. The first partial image data having undergone the image process is supplied to the first printhead 111 to form an image.

The second image processing unit 107 performs an image process for improving the image quality at the joint between printheads, for partial image data stored in the second partial image memory 105. At this time, position information output from the division boundary data generation unit 108 is referred to as the shape of the joint. In addition, a correction parameter supplied from the correction parameter calculation unit 110 is also referred to.

The head position detection unit 109 detects and outputs a print dot interval δ at the joint as an amount representing the positional relationship between the first printhead 111 and the second printhead 112. The correction parameter calculation unit 110 converts the print dot interval δ at the joint, that is output as a phase difference parameter from the head position detection unit 109, into a correction parameter in accordance with a conversion characteristic set in advance on the basis of experiment or the like. The correction parameter calculation unit 110 outputs the correction parameter to the second image processing unit 107.

The conversion characteristic held by the correction parameter calculation unit 110 can be obtained as follows. A printer in which the print dot interval δ is set to a known value is prepared, density nonuniformity correction (to be described later) is performed for various correction parameter values, and many print samples are formed. A print sample whose density nonuniformity is improved most is selected from these print samples. Such print sample can be selected by density measurement of a print sample or organoleptic test determined by the subject. A correction parameter used to form the selected print sample serves as the optimal value of the correction parameter that corresponds to the set print interval δ. In the same manner, the optimal values of correction parameters are obtained for various print dot intervals δ. As a result, a characteristic curve representing the relationship between the print dot interval δ and the optimal value of the correction parameter is obtained. This curve is the conversion characteristic.

Figure 3:
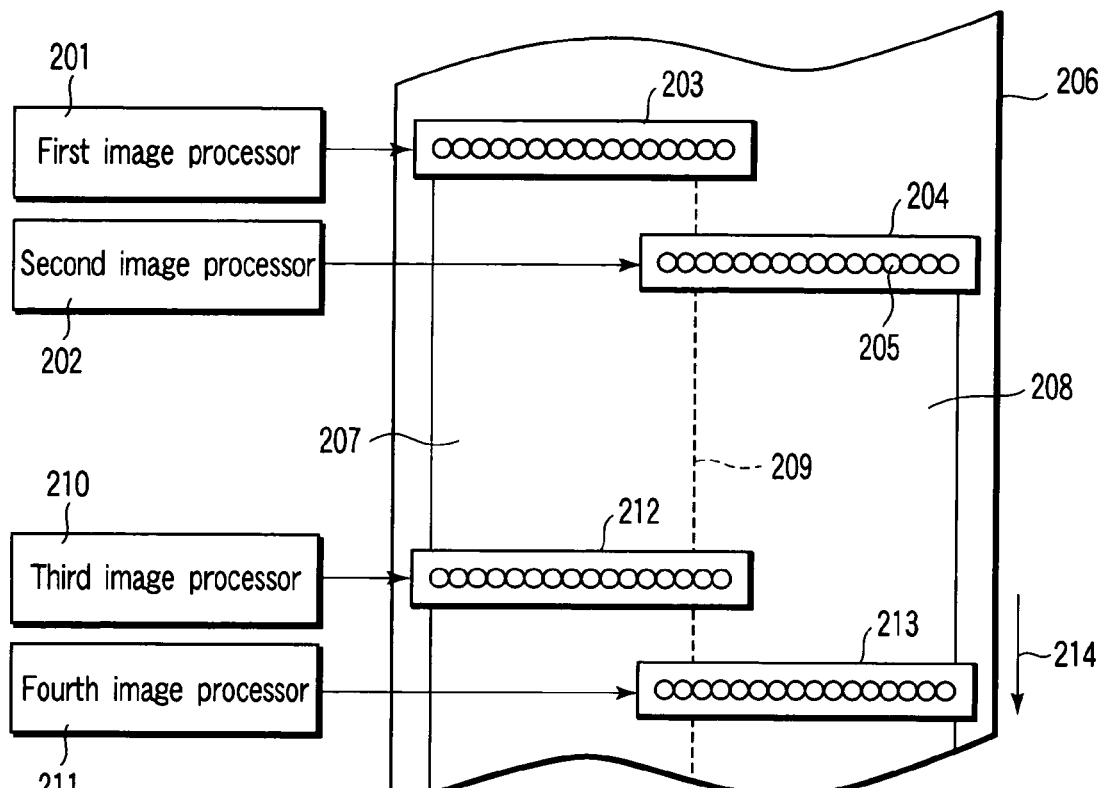
FIG. 3 is a view showing the positional relationship between a printhead and a print medium.

FIG. 3 is a conceptual view showing the positional relationship between the printhead and a print medium. In FIG. 3, a first image processing unit 201 and second image processing unit 202 perform an image process for improving the image quality at the joint between printheads, and supply image data to the printheads. The first image processing unit 201 and second image processing unit 202 correspond to 106 and 107 in FIG. 1. Printheads 203 and 204 correspond to 111 and 112 in FIG. 1. The printheads 203 and 204 are formed by linearly arranging many printing elements 205. For example, in an inkjet printer, ink droplets are discharged from the printing elements to form print dots on a print medium 206.

When print dots are to be formed on the print medium 206 by the printheads 203 and 204, the print medium 206 moves from up to down relatively to the printheads 203 and 204, as indicated by an arrow 214 in FIG. 3. As a result, the printheads 203 and 204 form images 207 and 208. The printheads 203 and 204 are arranged so that their printable regions partially overlap each other. A joint 209 between the formed images is made inconspicuous by an image process (to be described later).

In multi-color printing, new printheads 212 and 213 can be added by a necessary number of colors. A third image processing unit 210 and fourth image processing unit 211 supply image data to the printheads 212 and 213, respectively.

Figure 4A:
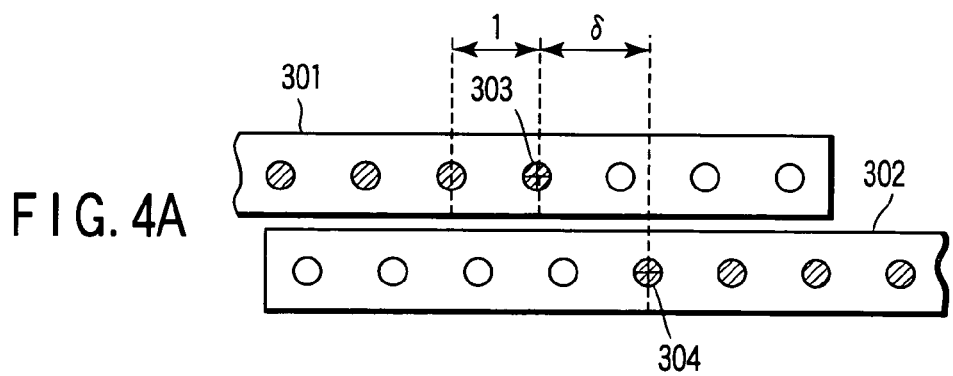
FIGS. 4A and 4B are schematic views for explaining a method of dividing an image signal for the first printhead and second printhead and supplying the image signals.
Figure 4B:
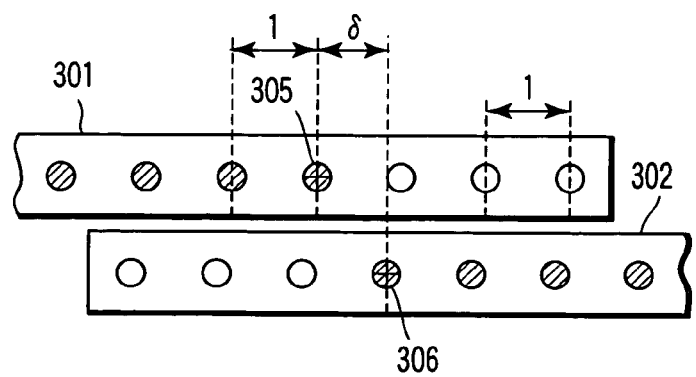

A method of forming images at a joint by printheads whose positions are not adjusted will be described with reference to FIGS. 4A and 4B. In FIGS. 4A and 4B, a first printhead 301 represents the right end part of the printhead 203 in FIG. 3. A second printhead 302 represents the left end part of the printhead 204 in FIG. 3.

When the first printhead 301 and second printhead 302 are set with the positional relationship shown in FIG. 4A, image data is supplied from the first image processing unit 201 to the hatched printing elements up to the printing element 303 of the first printhead 301. Subsequent image data is supplied from the second image processing unit 202 to the hatched printing elements starting from the printing element 304 of the second printhead 302. In this case, the print dot density decreases at the joint unless density nonuniformity correction is done. Stripe-like density nonuniformity appears with low density at the joint.

When the first printhead 301 and second printhead 302 are set with the positional relationship shown in FIG. 4B, image data is supplied from the first image processing unit 201 to the hatched printing elements up to the printing element 305 of the first printhead 301. Subsequent image data is supplied from the second image processing unit 202 to the hatched printing elements starting from the printing element 306 of the second printhead 302. In this case, the print dot density increases at the joint unless density nonuniformity correction is done. Stripe-like density nonuniformity appears with high density at the joint.

Density nonuniformity correction will be described in detail. As shown in FIGS. 4A and 4B, the interval between printing elements is defined as one length unit. In FIGS. 4A and 4B, the print dot interval δ represents the phase difference along the line between the printing elements of printheads (in FIG. 4A, the printing element 303 of the first printhead 301 and the printing element 304 of the second printhead 302, and in FIG. 4B, the printing element 305 of the first printhead 301 and the printing element 306 of the second printhead 302).

It is effective to change the joint position not uniformly but at random for each print line in order to make the joint between printheads inconspicuous. This method will be explained.

Figure 5A:
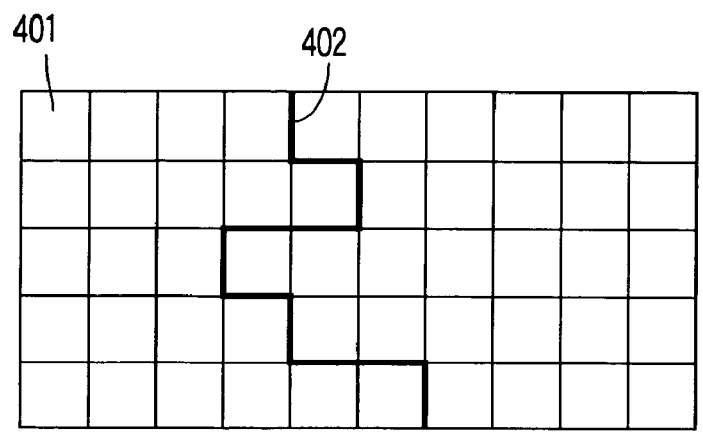
FIGS. 5A to 5C are views showing the state of a joint before density nonuniformity correction.

FIG. 5A is a conceptual view showing part of image data at the joint between printheads. Each square 401 represents one pixel data. Reference numeral 402 denotes division boundary data representing a division position used to divide image data for the first printhead and second printhead and form images. The division position changes along the printing element array direction (line direction) for each print line, as shown in FIG. 5A.

The division boundary data 402 is supplied from, e.g., the division boundary data generation unit 108 in FIG. 1. The division boundary data 402 may be stored in a ROM or the like in advance, or generated by a program or the like. An input image is divided by the first printhead and second printhead on the basis of the division boundary data 402, and then formed.

Figure 5B:
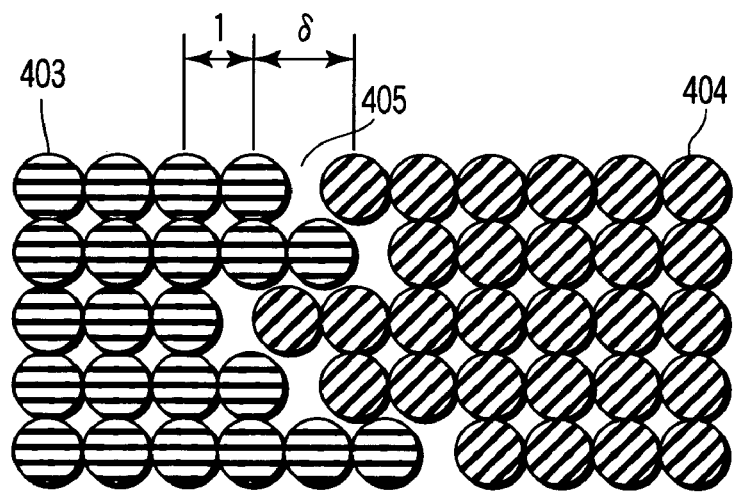
Figure 5C:
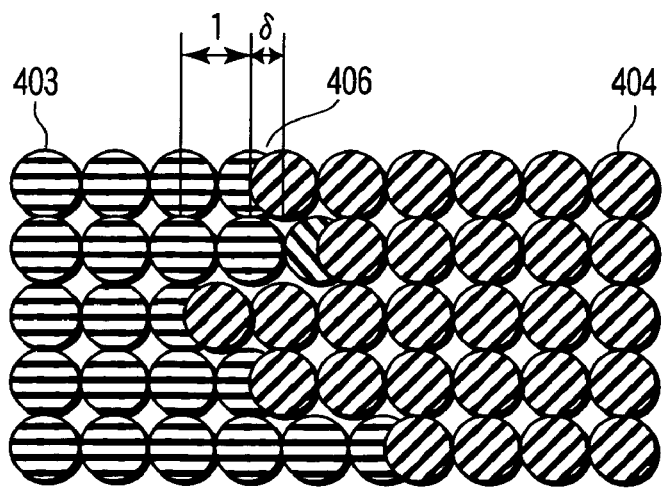

FIGS. 5B and 5C show examples of an image formed in correspondence with the division position of image data shown in FIG. 5A. FIGS. 5B and 5C show examples in which all pixels are printed. In practice, the number of print dots and the density change in accordance with image data.

FIG. 5B illustrates an example in which the print dot interval δ at the joint is larger than 1 (1<δ), as shown in FIG. 4A. Horizontal hatch print dots 403 and the like are formed by the first printhead, and tilt hatch print dots 404 and the like are formed by the second printhead. Since the print dot interval δ is larger than 1, portions 405 with large print dot intervals exist on respective lines, and are recognized as striped density nonuniformity with low density.

FIG. 5C illustrates an example in which the print dot interval δ at the joint is smaller than 1 (δ<1), as shown in FIG. 4B. Similar to FIG. 5B, horizontal hatch print dots 403 and the like are formed by the first printhead, and tilt hatch print dots 404 and the like are formed by the second printhead. Since the print dot interval δ is smaller than 1, portions 406 with small print dot intervals exist on respective lines, and are recognized as striped density nonuniformity with high density.

Figure 6A:
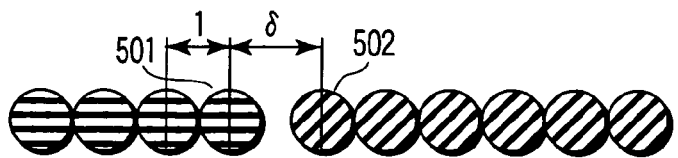
FIGS. 6A to 6D are views showing the state of one line at the joint before and after density nonuniformity correction.
Figure 6B:
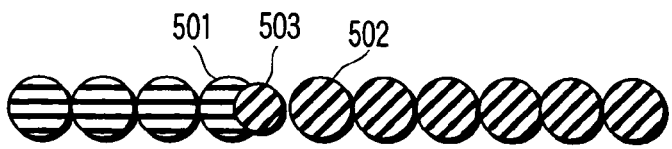

FIG. 6A shows the uppermost line in FIG. 5B. FIG. 6A shows a state before density nonuniformity correction (to be described later) is performed. Reference numeral 501 denotes a print dot formed by the first printhead; and 502, a print dot formed by the second printhead. FIG. 6B shows a state after the image shown in FIG. 6A undergoes density nonuniformity correction (to be described later). In FIG. 6B, the print dots 501 and 502 are formed by the same printing elements as those of the print dots 501 and 502 in FIG. 6A. This correction adds a print dot 503 to cancel density nonuniformity.

Figure 6C:
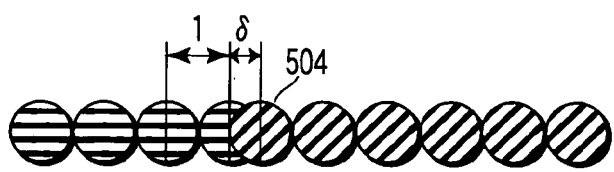
Figure 6D:
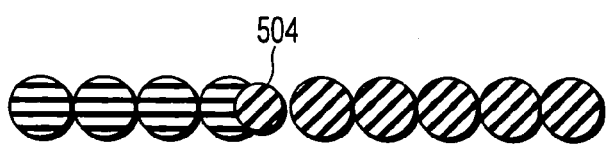

FIG. 6C shows the uppermost line in FIG. 5C. FIG. 6C shows a state before density nonuniformity correction (to be described later) is performed. A print dot 504 is formed by the second printhead. FIG. 6D shows a state after the image shown in FIG. 6C undergoes density nonuniformity correction (to be described later). In FIG. 6D, the print dot 504 is formed by the same printing element as that of the print dot 504 in FIG. 6C. This correction decreases the density (density effect as the area ratio) of the print dot 504 to cancel density nonuniformity.

Figure 7A:
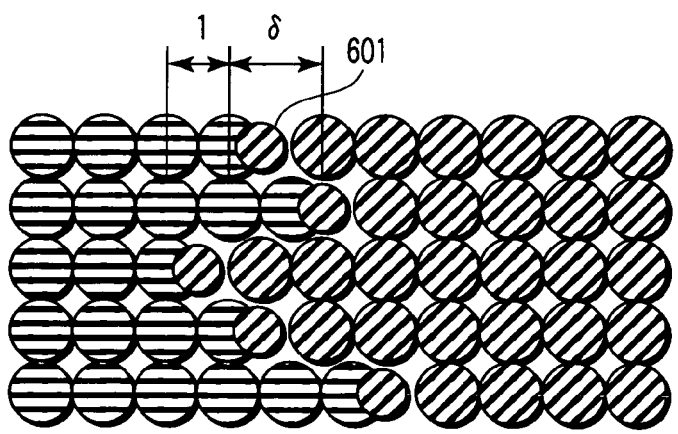
FIGS. 7A and 7B are views showing the state of the joint after density nonuniformity correction.
Figure 7B:
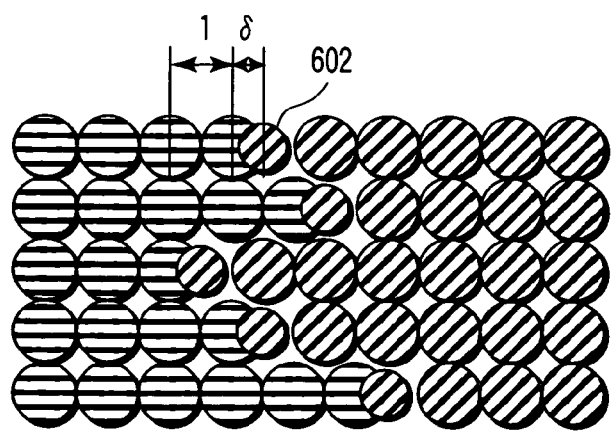

As a result of density nonuniformity correction, the image shown in FIG. 5B is corrected into one as shown in FIG. 7A, and the image shown in FIG. 5C is corrected into one as shown in FIG. 7B. In FIG. 7A, density nonuniformity is canceled by adding small print dots 601. In FIG. 7B, density nonuniformity is canceled by decreasing the density of print dots 602.

Details of the second image processing unit 107 shown in FIG. 1 will be explained with reference to FIG. 8. A range surrounded by a broken line 714 in FIG. 8 corresponds to the second image processing unit 107.

Figure 8:
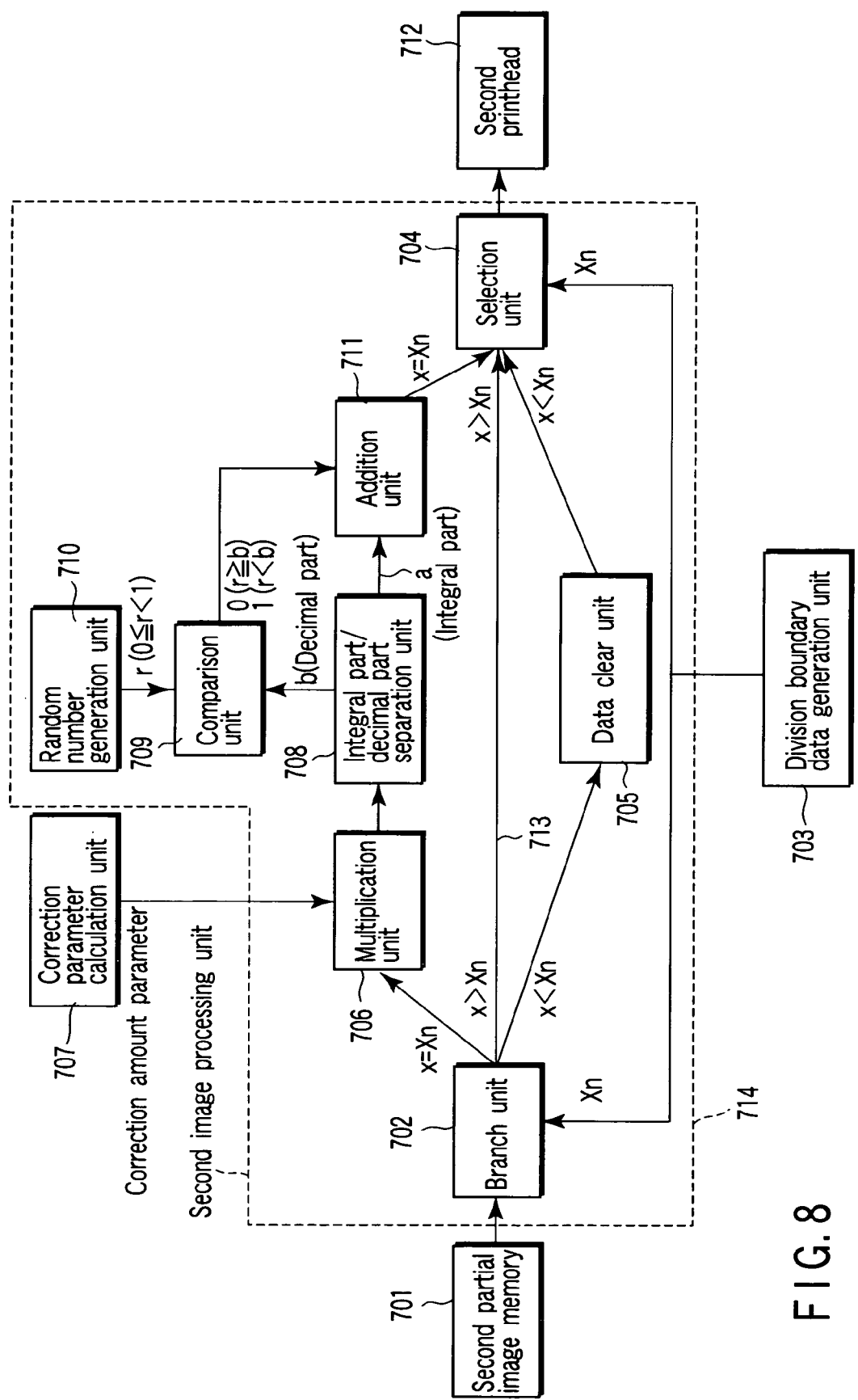
FIG. 8 is a block diagram for explaining details of the second image processing unit.

A second partial image memory 701 in FIG. 8 corresponds to 105 in FIG. 1; a division boundary data generation unit 703 in FIG. 8, to 108 in FIG. 1; a correction parameter calculation unit 707 in FIG. 8, to 110 in FIG. 1; and a second printhead 712 in FIG. 8, to 112 in FIG. 1.

A branch unit 702 in FIG. 8 switches the image process method for each pixel which forms image data. A selection unit 704 selects output data in accordance with the process in the branch unit 702. A data clear unit 705 sets pixel data to 0 (unprinted). A multiplication unit 706 multiplies a pixel signal branched from the branch unit 702 by a correction parameter output from the correction parameter calculation unit 707.

An integral part/decimal part separation unit 708 serving as a quantization unit separates a value output from the multiplication unit 706 into an integral part (a) and decimal part (b). A comparison unit 709 compares the decimal part (b) and a uniform random number r of 0 (inclusive) to 1 (exclusive) that is generated by a random number generation unit 710, and outputs 0 or 1 in accordance with the comparison result. An addition unit 711 outputs the sum of the integral part a and the comparison result of the comparison unit 709. The random number generation unit 710 and comparison unit 709 form a quantized density correction signal correction unit.

In this arrangement, pixel data which form image data read out from the second partial image memory 701 are branched to three different processes by the branch unit 702 in accordance with the coordinates in the line direction. At this time, the division boundary data generation unit 703 supplies division position data $X_n$ (n represents the number of lines) which changes depending on the line number of a pixel to be processed. $X_n$ is the x-coordinate of a pixel left adjacent to the division boundary when correction to decrease the density in accordance with a correction parameter output from the correction parameter calculation unit 707 is performed, and the x-coordinate of a pixel right adjacent to the division boundary in other cases.

As for pixels left to $X_n$, data are sent to the data clear unit 705, and after their values are corrected to 0, sent to the selection unit 704.

As for pixels right to $X_n$, data are sent to the selection unit 704 via a path 713 without changing their values.

As for a pixel at $X_n$, data is sent to the multiplication unit 706. The multiplication unit 706 multiplies the pixel data by a correction parameter output from the correction parameter calculation unit 707, and sends the product to the integral part/decimal part separation unit 708. The integral part/decimal part separation unit 708 separates the input value into an integral part a and decimal part b, and sends the integral part a to the addition unit 711 and the decimal part b to the comparison unit 709.

The comparison unit 709 compares the input decimal part b and the random number r of 0 (inclusive) to 1 (exclusive) output from the random number generation unit 710. The comparison unit 709 outputs 1 when the random number r is smaller than the decimal fraction b; otherwise, 0. An output (0 or 1) from the comparison unit 709 is sent to the addition unit 711. The addition unit 711 adds the output and the integer a, and sends the sum to the selection unit 704.

The selection unit 704 selects one output from three image data branched and output by the branch unit 702, and outputs the output value to the second printhead 712.

The image processes will be explained in more detail with reference to FIGS. 9A to 9D by exemplifying a printer capable of expressing the density at eight levels 0 to 7 for each print dot.

FIGS. 9A to 9D show the first line of image data stored in the second partial image memory. In FIGS. 9A to 9D, reference numeral 801 denotes a division boundary between a pixel at which an image is formed by the first printhead and a pixel at which an image is formed by the second printhead. The division boundary 801 corresponds to 402 in FIG. 5A.

A case in which the print dot interval δ at the joint is larger than 1, i.e., density nonuniformity with low density occurs, as shown in FIG. 5B, will be explained with reference to FIGS. 9A and 9B.

Figure 9A:
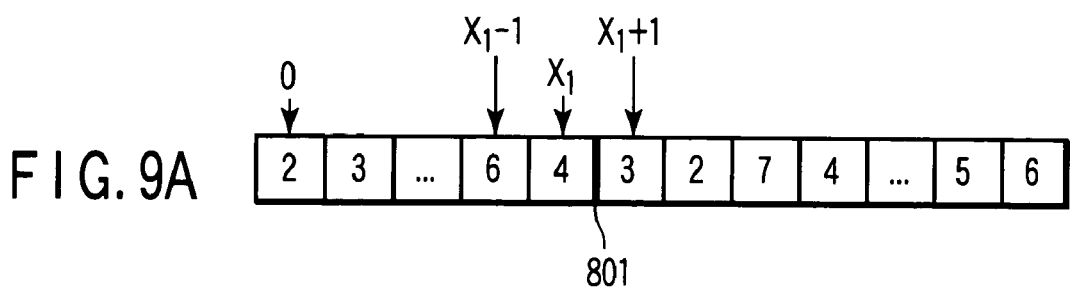
FIGS. 9A to 9D are views showing concrete examples of one line at the joint before and after density nonuniformity correction.

When correction to increase the density of image data shown in FIG. 9A is performed, $X_1$ is so set as to express a pixel left adjacent to the division boundary 801. Data of pixels having x-coordinates of 0 to $X_1-1$ are sent to the data clear unit (705 in FIG. 8) via the branch unit (702 in FIG. 8) where they are set to 0, and then sent to the selection unit (704 in FIG. 8).

As for a pixel having an x-coordinate of $X_1$, data is sent to the multiplication unit (706 in FIG. 8) via the branch unit (702 in FIG. 8). In the example of FIG. 9A, this pixel value is 4. Assuming that the correction parameter output from the correction parameter calculation unit (707 in FIG. 8) is 0.3 (correction amount representing addition of a print dot having 30% of the density of the original pixel value), an output from the multiplication unit (706 in FIG. 8) is 4×0.3=1.2.

The value "1.2" is separated into an integral part "1" and a decimal part "0.2" by the integral part/decimal part separation unit (708 in FIG. 8). The integral part "1" is sent to the addition unit (711 in FIG. 8), and the decimal part "0.2" is sent to the comparison unit (709 in FIG. 8). Since the random number generation unit (710 in FIG. 8) generates a uniform random number of 0 (inclusive) to 1 (exclusive), the comparison unit (709 in FIG. 8) compares the input decimal part "0.2" and the random number and outputs 1 at a probability of 20% or 0 at a probability of 80%.

The addition unit (711 in FIG. 8) adds 1 or 0 as an output from the comparison unit (709 in FIG. 8) to the integral part "1". The addition unit (711 in FIG. 8) outputs 2 at a probability of 20% or 1 at a probability of 80% to the selection unit (704 in FIG. 8). Signal values which can be input to the printhead are only integer values of 0 to 7, and a signal value of 0.2 as the decimal part cannot be directly input. However, an image is formed from many print dots, and thus even a probabilistic signal process using a random number can reflect the signal value of the decimal part in a formed image. An image having a density more faithful to input image data can be formed.

As for pixels having x-coordinates larger than $X_1$, data are sent from the branch unit (702 in FIG. 8) to the selection unit (704 in FIG. 8) via the path (713 in FIG. 8) without changing their values.

Figure 9B:
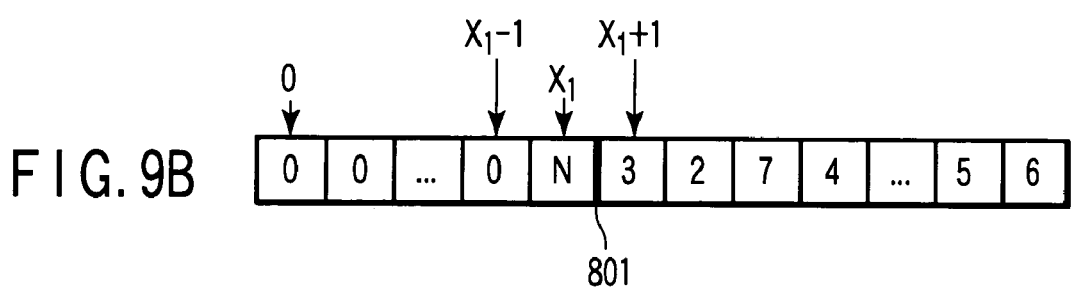

As a result of correction, image data shown in FIG. 9A is corrected into one as shown in FIG. 9B. In this case, N becomes 2 at a probability of 20% and 1 at a probability of 80%.

A case in which δ is smaller than 1, i.e., density nonuniformity with high density occurs, as shown in FIG. 5C, will be explained with reference to FIGS. 9C and 9D.

Figure 9C:
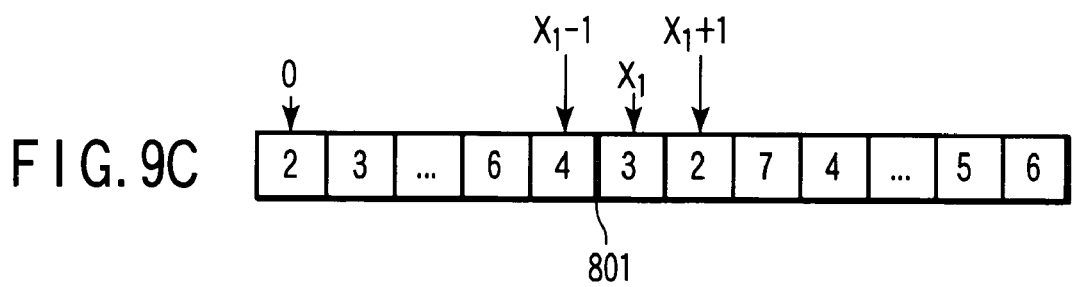

When correction to decrease the density of image data shown in FIG. 9C is performed, $X_1$ is so set as to express a pixel right adjacent to the division boundary 801.

Data of pixels having x-coordinates of 0 to $X_1-1$ are sent to the data clear unit (705 in FIG. 8) via the branch unit (702 in FIG. 8) where they are set to 0, and then sent to the selection unit (704 in FIG. 8).

Data of a pixel having an x-coordinate of $X_1$ is sent to the multiplication unit (706 in FIG. 8) via the branch unit (702 in FIG. 8). In the example of FIG. 9C, this pixel value is 3. Assuming that the correction parameter output from the correction parameter calculation unit (707 in FIG. 8) is 0.7 (correction amount representing setting of a density lower by 30% from the original pixel value), an output from the multiplication unit (706 in FIG. 8) is 3×0.7=2.1.

The value "2.1" is separated into an integral part "2" and a decimal part "0.1" by the integral part/decimal part separation unit (708 in FIG. 8). The integral part "2" is sent to the addition unit (711 in FIG. 8), and the decimal part "0.1" is sent to the comparison unit (709 in FIG. 8). Since the random number generation unit (710 in FIG. 8) generates a uniform random number of 0 (inclusive) to 1 (exclusive), the comparison unit (709 in FIG. 8) compares the input decimal part "0.1" and the random number and outputs 1 at a probability of 10% or 0 at a probability of 90%. The addition unit (711 in FIG. 8) adds 1 or 0 as an output from the comparison unit (709 in FIG. 8) to the integral part "2". The addition unit (711 in FIG. 8) outputs 3 at a probability of 10% or 2 at a probability of 90% to the selection unit (704 in FIG. 8).

As for pixels having x-coordinates larger than $X_1$, data are sent from the branch unit (702 in FIG. 8) to the selection unit (704 in FIG. 8) via the path (713 in FIG. 8) without changing their values.

Figure 9D:
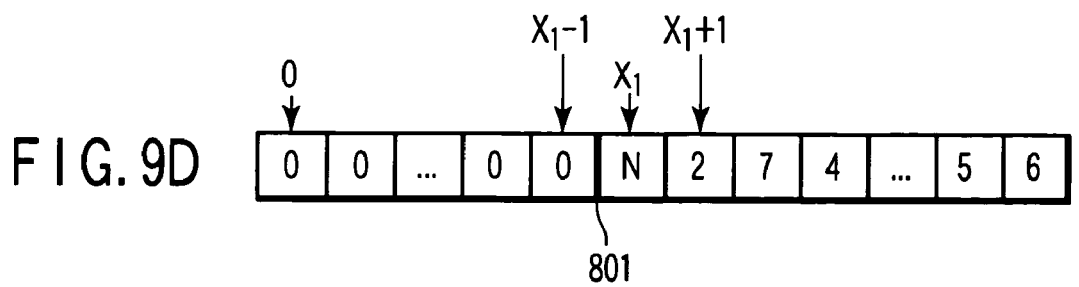

As a result of correction, image data shown in FIG. 9C is corrected into one as shown in FIG. 9D. In this case, N becomes 3 at a probability of 10% and 2 at a probability of 90%.

The process method for the first line has been described by exemplifying cases in which the correction parameter is equal to or larger than 1 and smaller than 1. This also applies to the second and subsequent lines. Note that the $X_n$ value is changed for each line in accordance with the division boundary shape as shown in FIG. 5A.

Figure 10:
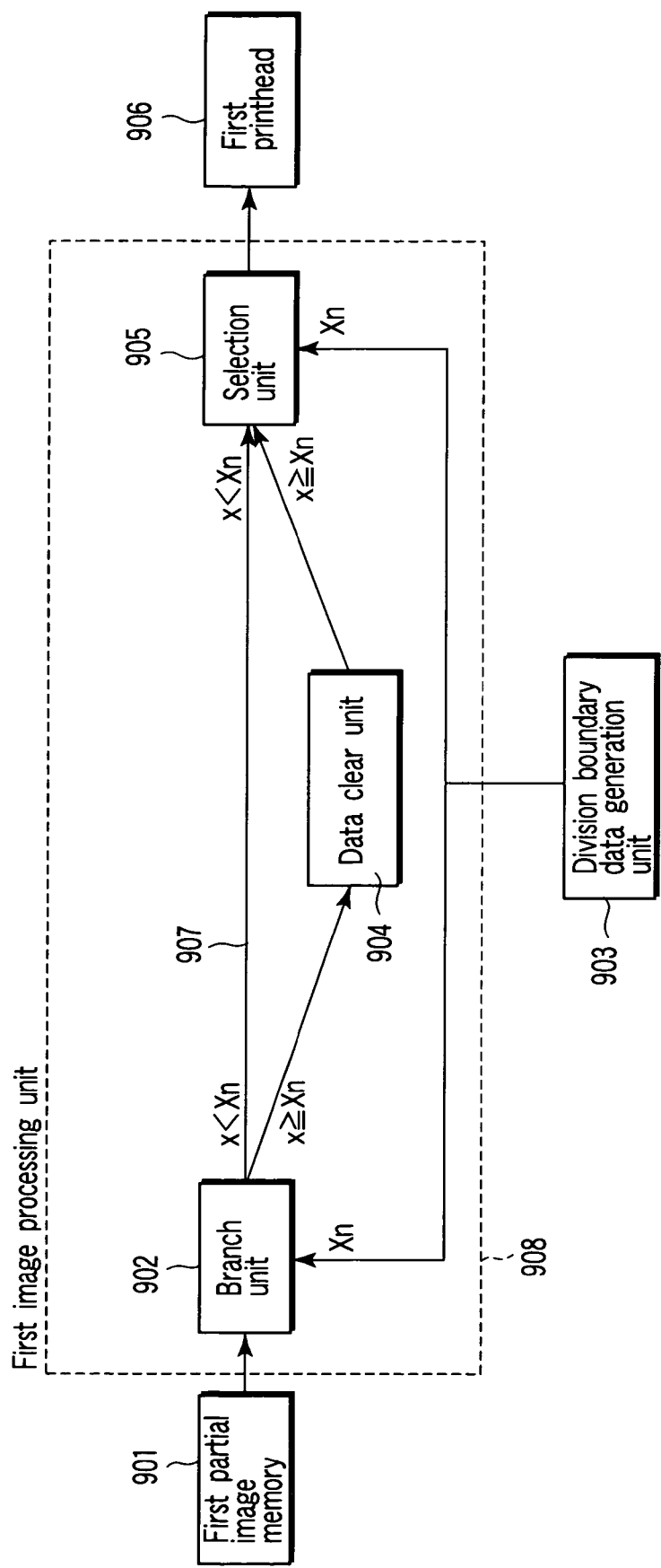
FIG. 10 is a block diagram for explaining details of the first image processing unit.

Details of the first image processing unit 106 shown in FIG. 1 will be explained with reference to FIG. 10. A range surrounded by a broken line 908 in FIG. 10 corresponds to the first image processing unit 106 in FIG. 1. A first partial image memory 901 in FIG. 10 corresponds to 104 in FIG. 1; a division boundary data generation unit 903 in FIG. 10, to 108 in FIG. 1; and a first printhead 906 in FIG. 10, to 111 in FIG. 1. A branch unit 902 has a function of switching the image process method for each pixel which forms image data. A selection unit 905 has a function of selecting output data in accordance with the process in the branch unit 902. A data clear unit 904 has a function of setting pixel data to 0.

In this arrangement, pixel data which form image data read out from the first partial image memory 901 undergo two different processes by the branch unit 902 in accordance with the coordinates in the line direction. At this time, the division boundary data generation unit 903 supplies, to the branch unit 902, division position data $X_n$ which changes depending on the line number of a pixel to be processed.

$X_n$ used in the first image processing unit 908 is obtained by adding the number of pixels corresponding to a width M shown in FIG. 2 to $X_n$ used in the second image processing unit (714 in FIG. 8). In the first image processing unit 908, $X_n$ is always the x-coordinate of a pixel right adjacent to the division boundary. As for pixels left to $X_n$, data are sent to the selection unit 905 via a path 907 without changing their values. As for a pixel at the $X_n$ position and pixels right to $X_n$, data are sent to the data clear unit 904 where their values are corrected to 0, and then sent to the selection unit 905. Consequently, the values of pixels left to the division boundary do not change, and those of pixels right to the division boundary are changed to 0.

As described above, the present invention can provide an image printing apparatus which reduces density nonuniformity at the joint between printheads and increases the image quality.

(Modification to First Embodiment)

In the above description, addition of a print dot for density correction and level correction are performed by only the second image processing unit. However, these processes may be performed by both the first image processing unit and second image processing unit or by the first image processing unit and second image processing unit alternately for each line. This can effectively make the joint inconspicuous.

In the above description, the joint is made inconspicuous by changing the joint position at random for each line. However, the joint position may be fixed or changed by another method when the joint is originally inconspicuous because of the printing characteristic or the like.

In the above description, a print dot for density nonuniformity correction with a signal level which is determined from a correction parameter corresponding to the phase difference and a pixel adjacent to the division boundary of a given line is formed at a position adjacent to the division boundary of the same line. However, a print dot may be formed at a position adjacent to the division boundary of a peripheral line such as the next line. Also in this case, almost the same density correction effect can be attained.

Figure 11:
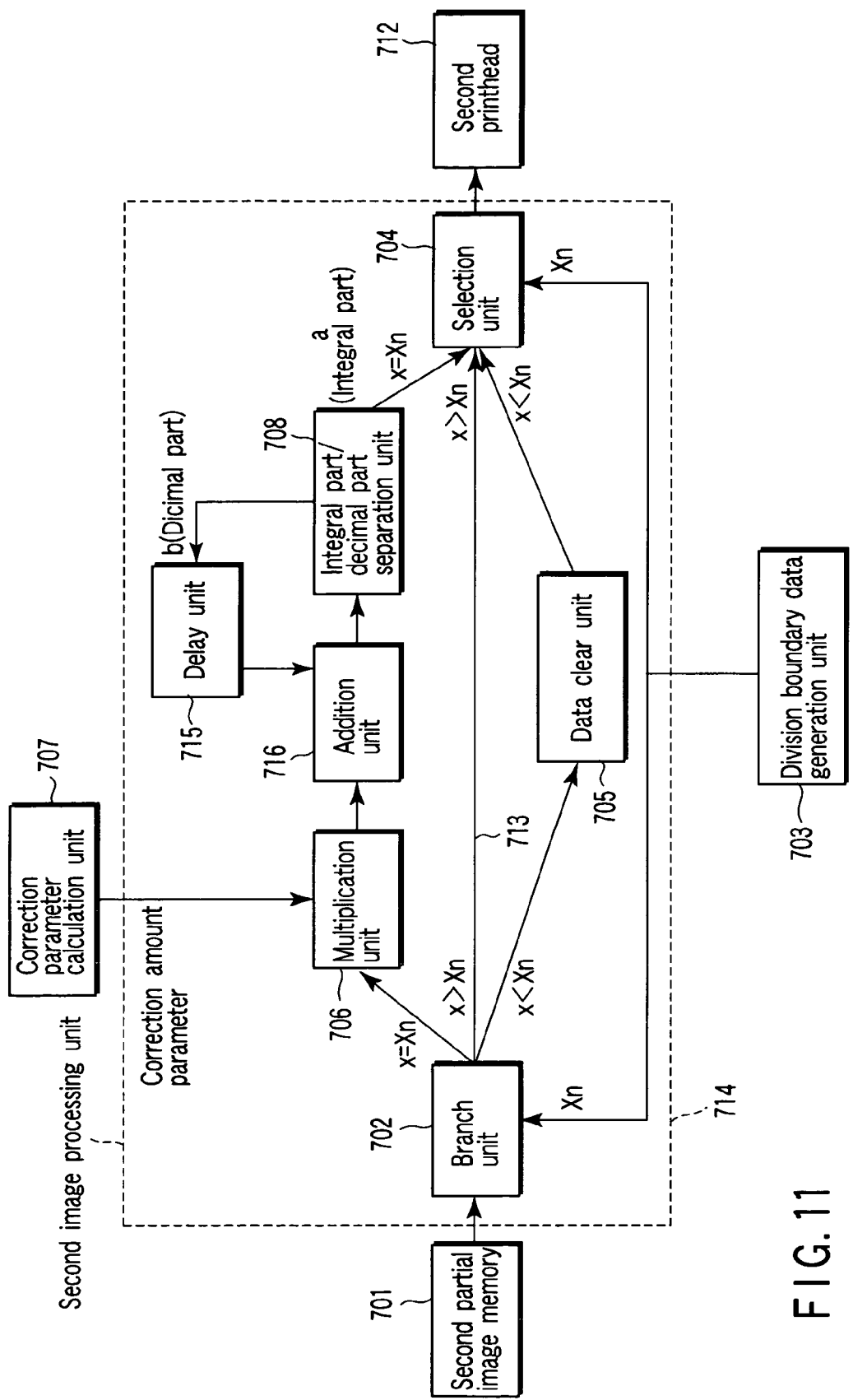
FIG. 11 is a block diagram for explaining a quantization error elimination method.

In the above description, an integral part for the same line is corrected in accordance with the value of a decimal part output from the integral part/decimal part separation unit. Alternatively, as shown in FIG. 11, a decimal part output from the integral part/decimal part separation unit 708 may be delayed via a delay unit 715 and added by an addition unit 716 to the result of the next process line from the multiplication unit 706. Hence, a quantization error generated in the current line is eliminated during the process of the next line, and an image more faithful to the original image is formed. In this manner, the quantized density correction signal may be corrected not only by the method (FIG. 8) of performing a process of correcting a density correction signal after quantization but also by the method (FIG. 11) of performing a process of correcting a density correction signal before quantization. The remaining arrangement in FIG. 11 is the same as that in FIG. 8.

The above embodiment has been described on the basis of an arrangement using hardware. However, the same operation effects can be achieved even by replacing the arrangement with an arrangement using software which operates similarly to each hardware arrangement.

The present invention can be effectively applied especially to a full-line type printhead having a length corresponding to the maximum width of a print medium which is printable by the image printing apparatus using a combination of printheads.

The present invention can also be effectively applied to a print band boundary in a serial scan type image printing apparatus which executes main scanning of the printhead and sub-scanning of the print sheet.

A printhead discharge recovery unit, preliminary auxiliary unit, or the like may be preferably added to the arrangement of the image printing apparatus according to the present invention in terms of further stabilization of the effects of the present invention. Examples of such unit are a printhead capping unit, a cleaning unit, a pressure/suction unit, a preliminary heating unit which performs heating using an electro-thermal transducer, a heating element, or a combination of them, and a preliminary discharge unit which performs discharge different from that for printing.

As for the type and number of mounted printheads, plural printheads may be mounted in correspondence with an ink of a single color, or plural printheads may be mounted respectively in correspondence with inks of different print colors or densities. In other words, the present invention can also be effectively applied to an apparatus not only having, as the print mode of the image printing apparatus, a print mode using only a main color such as black, but also having at least one of a multicolor print mode using different colors or a full-color print mode using a color mixture by an integral printhead structure or a combination of printheads.

In addition to liquid ink, the image printing apparatus may employ ink which solidifies at room temperature or lower temperatures and softens or liquefies at room temperature or by heating. The ink temperature may be adjusted in use. In order to prevent ink evaporation, the image printing apparatus may use ink which is solid in a normal state and liquefies by heating. In any case, the present invention can be effectively applied to an image printing apparatus which discharges liquid ink in accordance with a print signal or uses ink of a nature that has already started solidifying when it reaches a print medium.

The form of the image printing apparatus according to the present invention may be the form of an image output terminal for an information processing device such as a computer, the form of a copying machine combined with a scanner or the like, or the form of a facsimile apparatus having a transmission/reception function.

The present invention can provide an image printing apparatus which can reduce density nonuniformity at the joint between printheads and thereby increase the image quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image printing apparatus which prints image data using a plurality of printheads, each of which includes a plurality of printing elements, and which are arranged side by side substantially along an array direction of the printing elements, said apparatus comprising:

a density correction signal calculation unit which calculates a density correction signal based on a product of:
(i) a correction parameter set in accordance with a printing element positional relationship between the plurality of printheads in the array direction, and (ii) a signal value of at least one pixel adjacent to a switching position of image data from a printing element of one printhead to a printing element of another printhead where the printheads are adjacent;

a quantization unit which quantizes the density correction signal calculated by the density correction signal calculation unit into a quantized density correction signal having a signal level that can be input to one of the printheads; and a correction signal printing unit which forms at least one print dot adjacent to the switching position in one of a print line including said at least one pixel and a neighboring print line, based on the quantized density correction signal from the quantization unit.

2. An image printing apparatus according to claim 1, further comprimising a division boundary data generation unit which generates division boundary data for changing the switching position for each said print line.

3. An image printing apparatus according to claim 1, further comprising a quantized density correction signal correction unit which corrects the quantized density correction signal in accordance with a magnitude of a quantization error generated by quantizing the density correction signal.

4. An image printing apparatus according to claim 3, wherein the quantized density correction signal correction unit comprises:

a random number generation unit; and a comparison unit which compares the quantization error and a random number generated by the random number generation unit.

5. An image printing apparatus according to claim 3, the quantized density correction signal correction unit corrects the quantized correction signal of a subsequent print line in accordance with a quantization error generated by quantizing the density correction signal of a print line processed before said subsequent print line.

6. An image printing apparatus according to claim 1, further comprising a print dot interval detection unit which detects a print dot interval at the switching position as an amount representing the printing element positional relationship between the plurality of printheads.

7. An image printing apparatus according to claim 1, wherein the correction signal printing unit adds a print dot to a position adjacent to the switching position based on the quantized density correction signal when correction to increase a print density is performed, and prints a print dot adjacent to the switching position based on the quantized density correction signal when correction to decrease the print density is performed.

8. An image printing apparatus which prints image data using a plurality of printheads, each of which includes a plurality of printing elements, and which are arranged side by side substantially along an array direction of the printing elements, said apparatus comprising:

a density correction signal calculation unit which calculates a density correction signal based on: (i) a correction parameter set in accordance with a printing element positional relationship between the plurality of printheads in the array direction, and (ii) a signal value of at least one pixel adjacent to a switching position of image data from a printing element of one printhead to a printing element of another printhead where the printheads are adjacent;

a quantization unit which quantizes the density correction signal calculated by the density correction signal calculation unit into a quantized density correction signal having a signal level that can be input to one of the printheads; and a correction signal printing unit for adding a print dot to a position adjacent to the switching position based on the quantized density correction signal when correction to increase a print density is performed, and for printing a print dot adjacent to the switching position based on the quantized density correction signal when correction to decrease the print density is performed.

9. An image printing apparatus according to claim 8, further comprising a division boundary data generation unit which generates division boundary data for changing the switching position for each print line.

10. An image printing apparatus according to claim 8, further comprising a quantized density correction signal correction unit which corrects the quantized density correction signal in accordance with a magnitude of a quantization error generated by quantizing the density correction signal.

11. An image printing apparatus according to claim 10, wherein the quantized density correction signal correction unit comprises:

a random number generation unit; and a comparison unit which compares the quantization error and a random number generated by the random number generation unit.

12. An image printing apparatus according to claim 10, wherein the quantized density correction signal correction unit corrects the quantized correction signal of a subsequent print line in accordance with a quantization error generated by quantizing the density correction signal of a print line processed before said subsequent print line.

13. An image printing apparatus according to claim 8, further comprising a print dot interval detection unit which detects a print dot interval at the switching position as an amount representing the printing element positional relationship between the plurality of printheads.

14. An image printing apparatus according to claim 8, wherein the density correction signal calculation unit calculates the density correction signal based on a product of the correction parameter and the signal value of the at least one pixel adjacent to the switching position.

* * * * *